June 1, 1937. C. B. PALUCKI 2,082,079
LAMP FINISHING MACHINE
Filed Feb. 25, 1936 5 Sheets-Sheet 1
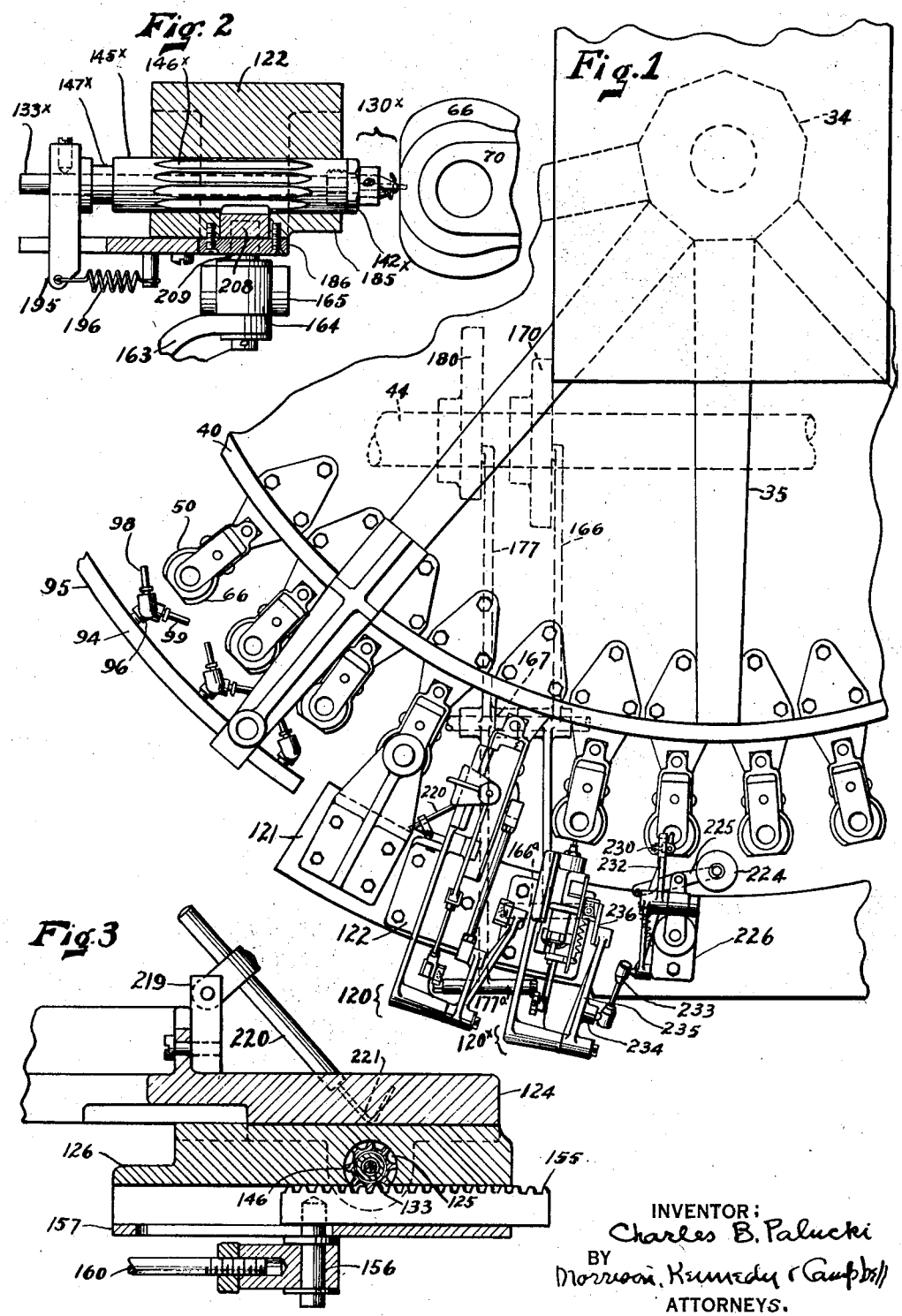
INVENTOR:
Charles B. Palucki
BY Morrison, Kennedy & Campbell
ATTORNEYS.

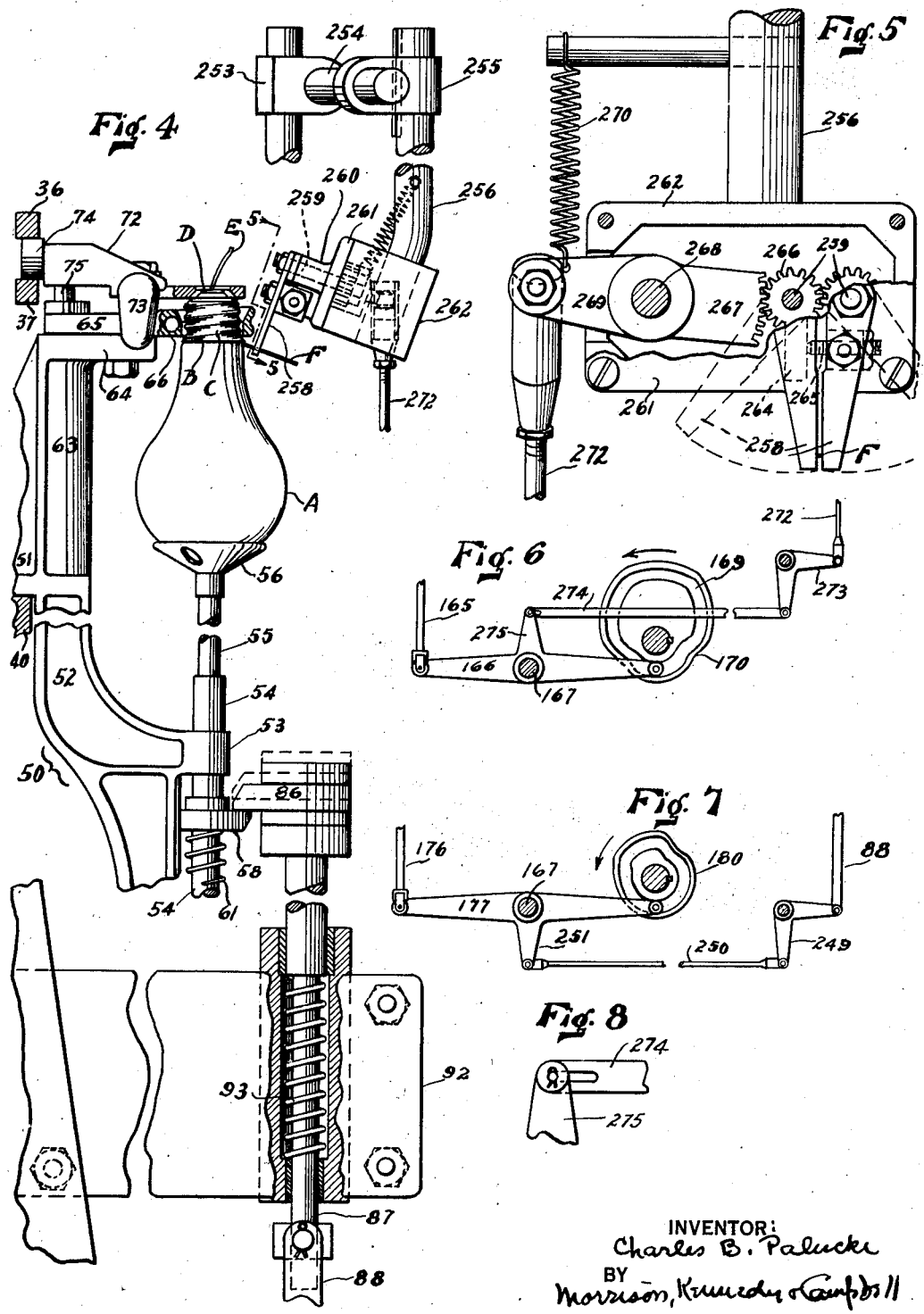

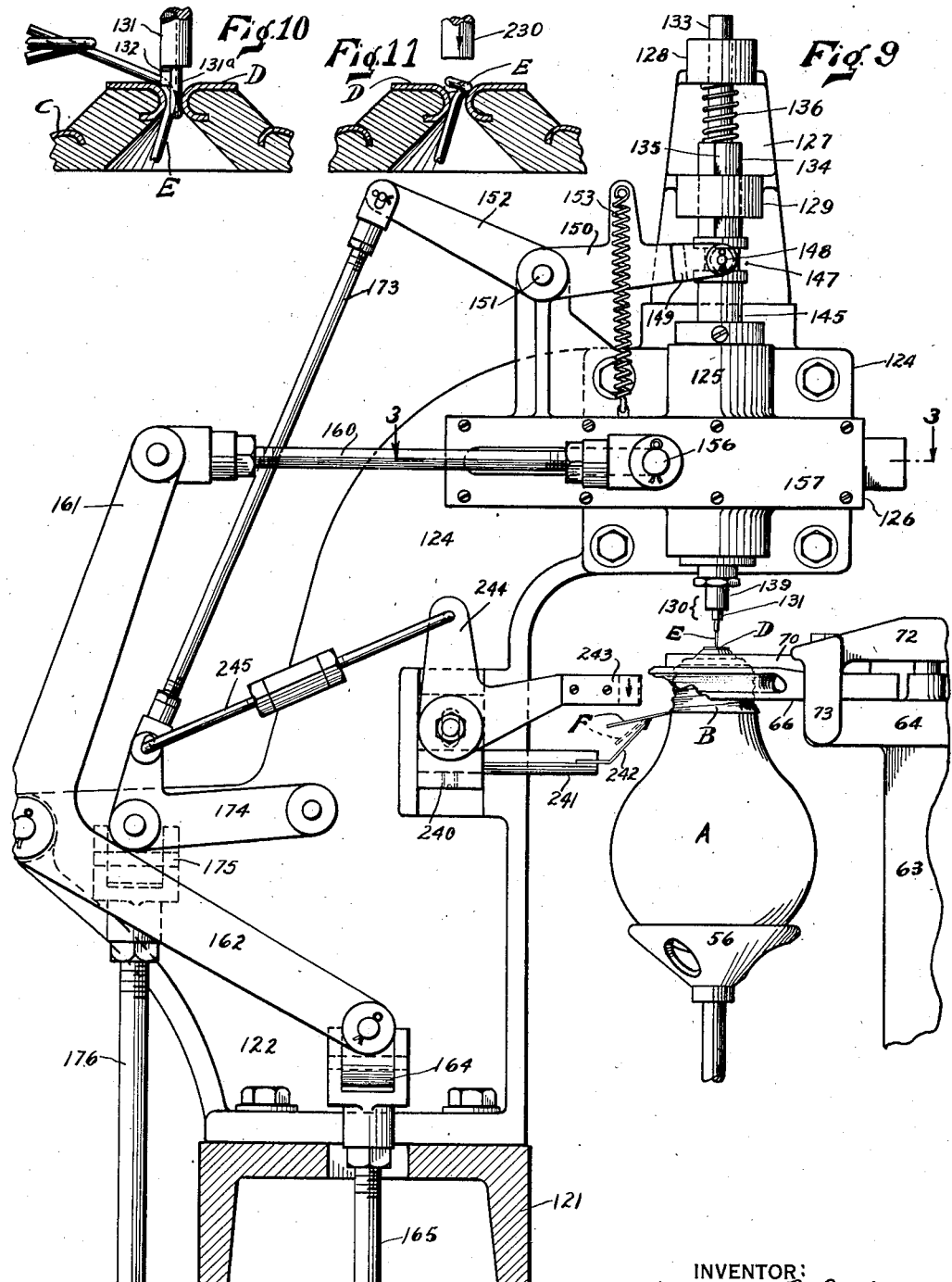

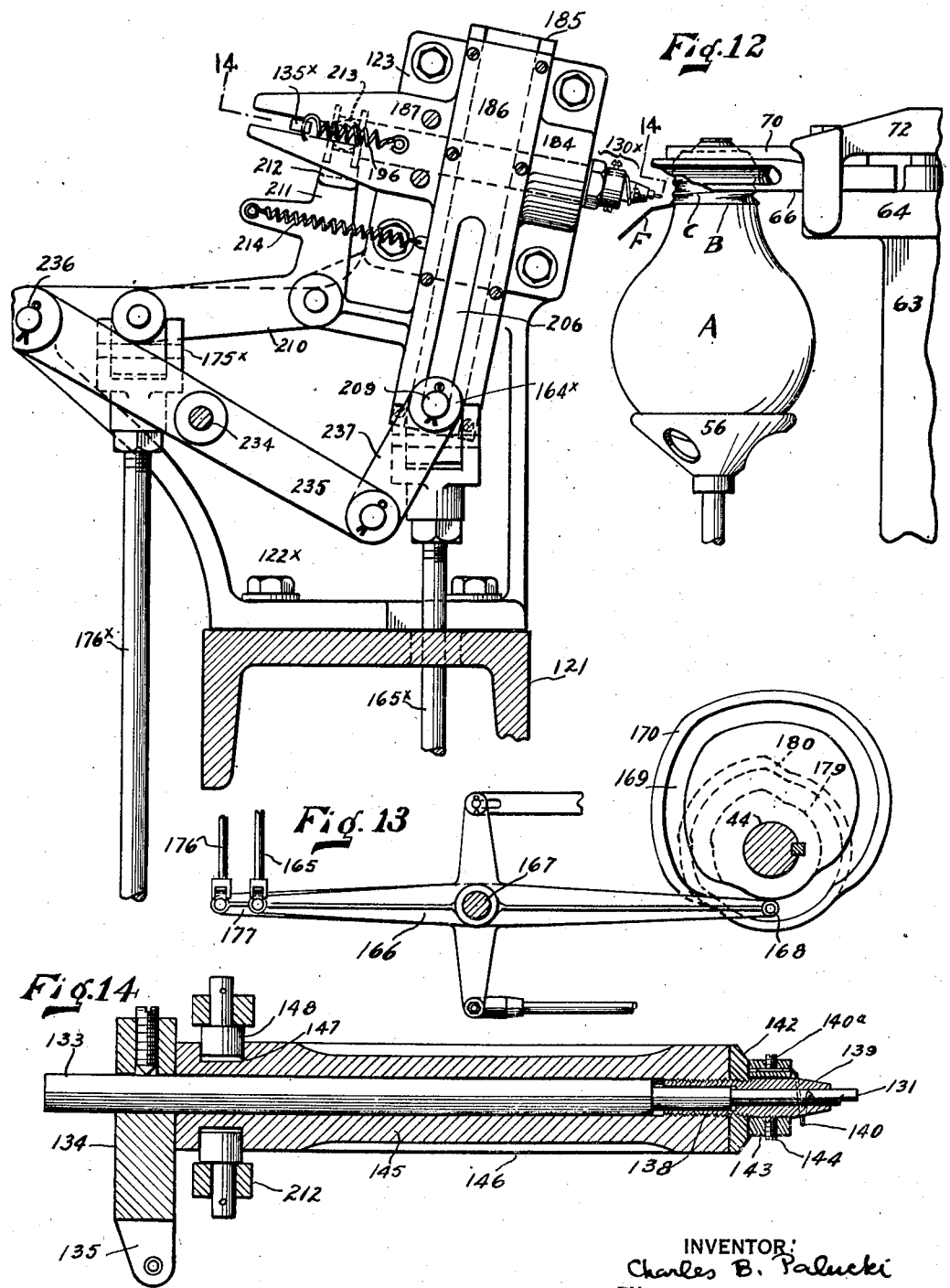

June 1, 1937. C. B. PALUCKI 2,082,079
LAMP FINISHING MACHINE
Filed Feb. 25, 1936 5 Sheets-Sheet 5
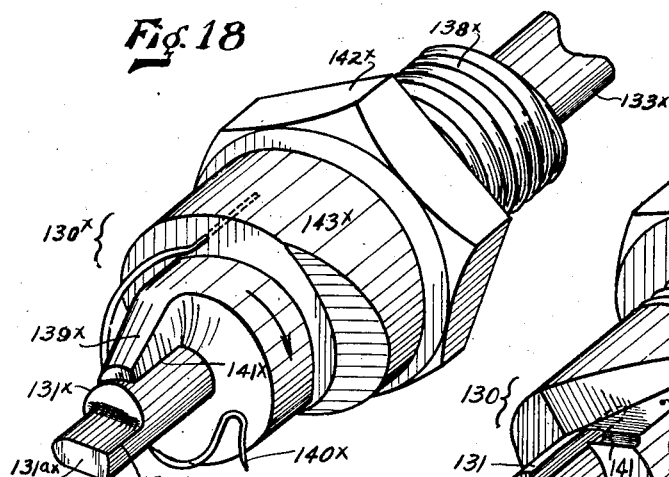
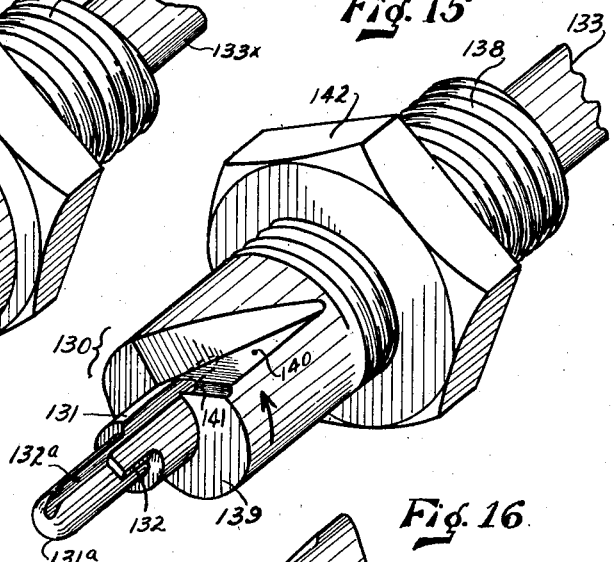
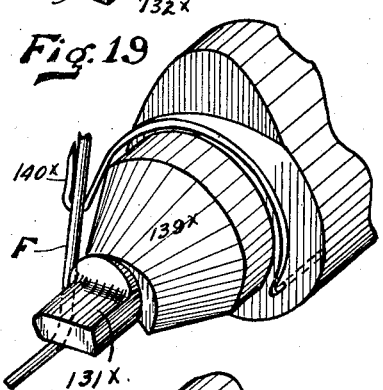
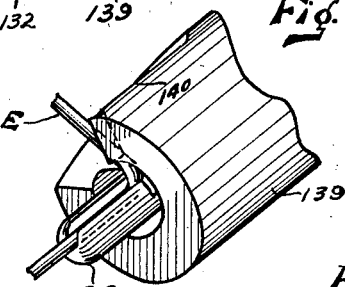
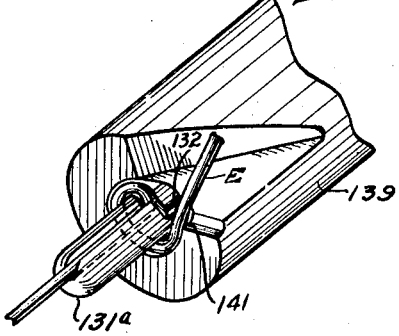
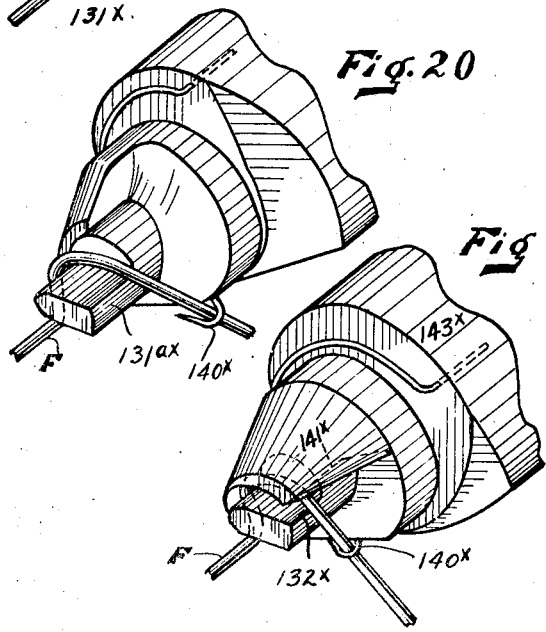
INVENTOR:
Charles B. Palucki
BY Morrison, Kennedy & Campbell
ATTORNEYS.

Patented June 1, 1937

2,082,079

UNITED STATES PATENT OFFICE 2,082,079

LAMP FINISHING MACHINE

Charles B. Palucki, Bergenfield, N. J., assignor to Alfred Hofmann & Company, West New York, N. J., a corporation of New Jersey Application February 25, 1936, Serial No. 65,568

20 Claims. (Cl. 176—3)

This invention is a novel lamp finishing machine, of the class performing automatically one or more of the following operations (1) the basing operation consisting of attaching or cementing, by the aid of heat, of the base or end member of the lamp to the glass container or bulb member from which extend the embedded leadwires; (2) the bending or positioning of the leadwires into their intended positions and the severing of the excess lengths of wire; (3) and the soldering of the respective leadwires to the respective metallic portions of the base. The invention is shown applied to that type of machine wherein is an endless or circular series of lamp-holding heads or chucks caused to travel a designated path or circuit, preferably intermittently, the successive operations being performed during travel or at particular stations. This is a continuation in part of prior application filed April 27, 1934, Serial No. 722,627, patented February 2, 1937 No. 2,069,386, which may be referred to for various disclosures omitted herefrom; the present case containing also features of improvement over the prior application.

The general objects of the invention are to afford a lamp finishing machine of the class stated, in which the bending and severing operations are performed with efficiency, and in which a large output or production is possible. A further object is to improve the operation by accuracy and reliability of action, so as to turn out a more uniformly perfect product. Other and further objects and advantages of the invention will be explained in the following description of an illustrative embodiment thereof or will be manifest to those conversant with the subject.

To the attainment of such objects and advantages the present invention consists in the novel lamp finishing machine and the novel features of method, operation, combination, mechanism and construction herein illustrated or described.

In the accompanying drawings Fig. 1 is a partial top view of a finishing machine embodying the invention.

Fig. 2 is a top view of part of the side leadwire bending and severing device or instrument partly in section taken on section line 2 of Fig. 12.

Fig. 3 is a horizontal section of the end leadwire instrument or device taken on line 3 of Fig. 9.

Fig. 4 is a left elevation of one of the lamp carrying heads or chucks, with its part shown in a special adjustment as will be described, together with cooperating devices arranged at a suitable point to reposition each lamp in its chuck.

Fig. 5 is a rear side view of part of the repositioning device shown in Fig. 4.

Figs. 6 and 7 are right elevations showing the actuating connections of the repositioning mechanism, shown also in Fig. 13.

Fig. 8 is an enlarged detail view of part of Fig. 6.

Fig. 9 is a right elevation of the mechanism for bending and severing the end or top leadwire.

Figs. 10 and 11 are enlarged vertical section views showing certain stages of operation in the bending and severing of the end leadwire.

Fig. 12 is a right elevation of the mechanism operating on the side leadwire.

Fig. 13 is a right elevation of part of the actuating connections, consisting substantially of Figs. 6 and 7 combined.

Fig. 14 is a central section of one of the leadwire bending and severing instruments.

Fig. 15 is a perspective view of the end wire bending and severing instrument; and Figs. 16 and 17 are similar partial views thereof showing later positions of the parts. Similarly Figs. 18 to 21 are perspective views of the side wire bending and severing instrument shown in several successive positions.

Figs. 1, 2, 3 and 4 correspond at least in part with Figs. 1, 11, 10 and 4 of said prior application; also Figs. 6, 7 and 13 with Fig. 8, Figs. 9 and 12 with Fig. 7, and Fig. 14 with Fig. 12; also Figs. 15 and 18 with Figs. 14 and 13, of the prior application.

The assembled lamp parts are shown in Fig. 4 and others, comprising the glass container or bulb member A, and the base member B, the latter comprising the screw threaded metallic sleeve C, lined with cementing material, not shown, and the metallic button or disk D at the end, separated from the sleeve by insulating material. Connected with the filament are the two leadwires, the end lead wire E issuing through a central perforation in the disk D, and the side leadwire F issuing between the glass bulb and the lower rim of the screw sleeve C. The end wire E is to be formed into a bend or curl adjacent the disk D as in Fig. 11 shown, and the side wire F bent snugly against the lower edge of the metal base, and both later are attached or soldered to these parts.

The lamp parts, bulb and base in loosely assembled condition are loaded into each of the successive heads and as they advance are subjected to heating, followed by cooling, and thereafter the cutting off to the proper length of the respective leadwires and the bending or curling of them into soldering position, and thereafter the soldering operations.

The general machine construction is indicated in Figs. 1 and 4, the frame and other general parts being shown in the prior application. At the frame center is a hub 34 from which radiate fixed arms 35 constituting a spider, and at the outer ends of the arms are secured upper and lower fixed circumferential tracks 36 and 37, constituting cams operating by the travel of the heads to control the latter.

Rotating on suitable bearings in the frame is a turret 40 having intermittent drive means. In each cycle of the machine the turret is advanced to the extent of one space or head, the step-drive means (not shown) being operated from a horizontal drive shaft 44. Each head thereby is brought to each station around the orbit of travel.

For convenience certain relative terms will be used without intending them as limitations, as many positions or relations of parts may be changed. Thus "front" is herein used as referring to the exterior side of the orbit or path of travel of the lamp series, while "rear" indicates the opposite or the interior side or central portion of the machine. In this sense Fig. 4 is a left elevation, and the right side of this figure is the front of the machine. So also words of direction like "up" and "down" are used relatively, and as shown the base of the lamp is at the top end of the lamp, although the same principles could be used with the lamps relatively inverted.

The head 50 is shown in Figs 1, 4, 9 and 12. It has a flange 51 by which it is attached to the turret 40. From the flange depends a bracket 52 having forwardly extending lugs or slide bearings 53, upper and lower, through which slides vertically a bearing sleeve 54, within which slides a plunger 55, at the top of which is mounted a spring-lifted chuck member in the form of a cup, ring or socket 56 adapted to receive and hold the rounded end of the lamp bulb.

Attached upon the sleeve 54 is a projecting collar 58. The plunger sleeve and the collar yield downwardly, resisted by a spring 61 confined between the collar and the lower bearing or lug 53. An assembled lamp may be inserted by lowering the collar, plunger, sleeve and cup, to admit the lamp, and allowing them to rise until the cup presses the lamp bulb in its chucked position.

The head or chuck 50 comprises not only the depending bracket 52 in which the lower chuck member 56 slides, but the upstanding bracket 63 supporting the upper chuck member 70. At the top of bracket 63 is a front flange 64 upon which is bolted the shank 65 of a ring member 66, termed a basing ring or flame shield. This ring is heated by the flames and transmits the heat to the lower part of the lamp base, wherein is contained the cement material adapted to be softened by the heat for cementing the base member to the bulb under the pressure of spring 61.

These parts 63 to 66 are relatively fixed on each head, and the flame ring is larger than, and surrounds loosely, the lamp base, facilitating insertion of the lamp into the head. The ring and chuck are relatively shiftable; the ring being shown stationary, the chuck and lamp are vertically shiftable. Fig. 4 shows the lamp lowered into a special relaxed or loose position. Figs. 9 and 12 show the chuck and lamp relatively lowered into position for the leadwire operations, the ring surrounding the upper part of the sleeve, the lower part thereof being exposed below the ring. During heating the chuck and lamp are raised.

The lamp is held between the cup or ring 56 below, and a top ring or socket 70, these constituting the active holding or chuck members of the head. The central part of the lamp base enters the opening in the ring 70, and the elevation of this ring determines the position of the lamp, the cup being spring-lifted. The chuck ring 70 has a shank bolted to a vertically adjustable block 72. This block, to maintain the relation of the parts, has depending ears 73 sliding at opposite sides of the flange 64. At its rear the block 72 carries a stud or cam roll 74 by which the block is lifted and lowered through the fixed cams or tracks 36 and 37, see Fig. 4.

Cam 37 operates to determine the altitude of the chuck ring and lamp. For example block 72 is mounted at the top end of a vertical rod 75 which slides through an aperture in the flame ring shank 65 and down into a bore in the bracket 63, in which is a compression spring lifting the rod and chuck ring.

For depressing the chuck cup 56 to relax the lamp, for purposes later described, the following connections are shown. A finger 86, Fig. 4, normally overlies the collar 58 at a suitable station, preferably preceding the heating operations. The finger is mounted at the top of a rod 87 which slides through a bracket 92, and the lower end of the rod is connected by a link 88 to cam connections to be described. Thereby the rod 87 may be depressed against a spring 93 to pull down the cup 56, permitting the relaxed lamp to be repositioned and the parts restored. Analogous means to lower the cup for inserting each lamp is shown in the prior application.

A fuel supply pipe 94 conveys a mixture of gas and air under valve control. A curved gas-air duct 95 distributes the mixture to an extended series of burners operating upon the basing ring and lamp, for example at sixteen positions and during travel between them. From the duct 95 extend rearwardly a series of nipples 96, Figs. 1 and 3, each having a short vertical connection constituting a chamber from which extend to the left a burner 98 and to the right a burner 99 directed to the basing rings 66.

Beyond the last flame the cam 37 lowers the lamp into its lowered position of Fig. 9. While the lamp is undergoing gradual cooling it is subjected to the succeeding operations including the bending and severing of the end and side leadwires by mechanisms 120 and 120$^\times$, respectively, and thereafter the soldering of the wires. Following the heating means may be employed for expediting the cooling of the lamp base to harden the cement.

The bending and severing mechanisms 120 and 120$^\times$ shown in small scale on Fig. 1 operate respectively to bend or curl the end and side leadwires E and F and cut them off short, leaving the curled ends adjacent to the end disk D and screw sleeve C respectively of the lamp base member, in the most advantageous position for the subsequent soldering. The details are shown in Figs. 2 to 21. These two mechanisms shown at different stations, may be combined to handle both leadwires at the same station, as in the prior application shown.

The leadwire mechanisms are mounted on a curved fixed front table 121. Mechanism 120 is a unit having its own base 122, and mechanism 120× has a similar base 122×. On base 122× is an upright bracket 123, carrying the side bending and severing device or instrument 130× to be described, shown in Figs. 12 and 18 to 21. On base 122 is an extension bracket 124 overhanging the path of the heads and lamps and carrying the top or end instrument 130 to be described, shown separately in Figs. 9 and 15 to 17. The section view Fig. 14 substantially represents both instruments.

Referring first to the top or end instrument 130, the overhanging bracket 124 is formed with an enlargement 125 constituting a vertical slideway for the instrument, and with a horizontal way 126 to accommodate a rack 155 to be described, and thereabove a vertical guide bracket 127, carrying bearing lugs 128 and 129.

The instrument 130 is shown as composed of several relatively movable parts, including a non-rotary mandrel 131 which takes part both in the bending and the cutting of the wire. The mandrel has a reduced extremity 131a to contact the lamp base and a cutting edge 132 to shear the bent wire. It also has a groove 132a or shoulder to hold the wire while being bent around the mandrel.

The mandrel is formed or mounted at the lower end of an upright shank 133 having shoulders near its lower end as appears in Fig. 14. At the top end of the mandrel shank 133 is screw-attached a collar or block 134 engaging by projection or key 135 with a groove in the vertical bearing 129 of the guide plate 127, thus preventing rotation of the shank and mandrel while permitting vertical play, a second lug 128 giving a higher bearing for the top end of the shank. A spring 136 between the lug 128 and collar 134 presses constantly downward, tending to lower the mandrel, as the instrument comes into action, until its extremity 131a has entered the recess of and is stopped by the end disk D of the lamp base.

Rotatable on the mandrel part of the instrument is a complementary part 139 cooperating with the mandrel both for bending or curling the wire and severing it. Thus, the rotary member 139 has a recess forming a shoulder 140 adapted to engage the wire and wrap it around the mandrel. The rotary part 139 also is formed with a cutting edge 141 adapted to cooperate with the cutting edge 132 of the mandrel to sever or shear off the excess wire after it has been curled around the mandrel in contact with the lamp base disk.

The rotary bender or part 139 is shown constructed with a hollow extension 138, threaded into a long sleeve-shank 145, and secured thereon by a locknut 142. The sleeve-shank 145 is shown surrounding the shank 133 of the mandrel. The sleeve-shank is adapted to slide vertically in the way 125 and to rotate therein, relatively to the mandrel shank, for the cutting and bending operations.

For rotating the sleeve-shank 145, and the sleeve bending and cutting parts 140, 141, the sleeve is shown with elongated gear teeth 146, Fig. 14. For vertical shifting of the bender shank 145 it is formed at its upper end with a circumferential groove 147, engaged by opposite studs 148 mounted on a fork 149 at the end of a lever arm 150, Fig. 9, swinging vertically about a fixed pivot 151 and having a front arm 152, the actuation of which will be later described. A spring 153 pulls down on the arm 150 tending to lower the sleeve-shank 145 and carried parts. The spring 136 already mentioned tends to hold the mandrel and its shank down, with the block 134 in contact upon the sleeve-shank 145. Thereby with the swing of lever 150—152 the mandrel and the rotary bender move downwardly together, until the former is stopped by contact with the lamp base, following which the bender continues its downward movement relatively to the mandrel. This extra advance brings the bender 140 and severing edge 141 into operative relation to the mandrel and its severing edge 132.

For rotating the toothed shank 145 there is shown a toothed rack 155, Fig. 3, mounted in the horizontal way 126, the teeth of said rack engaging the teeth of the shank, the latter being elongated to permit the sliding movements of the shank. The rack near its rear end has stud 156 passing through the slotted cover 157 of the slideway, so that the rack may be operated by right and left shifting of the stud.

Preferably the mandrel 131 and rotary bender 139 are operated in harmony through the lever 150—152 and the rack 155, respectively, by automatic connections from cams on the main shaft 44. The connections may be as follows. The stud 156 of the rack 155 is connected by a rod 160 with the upper end of a lever arm 161 pivoted on the base 122 and having an inclined arm 162, the extremity of which is connected with a block 164, from which block depends a long link 165 extending to a cam lever 166 mounted on a fixed stud or fulcrum axle 167, see Figs. 6 and 13, the rear end of the lever having a follower 168 entering the cam groove 169 of a cam disk 170 mounted on a main shaft 44. By these connections the cam rotates the bending part.

The vertical reciprocation of the bending part 139 controls that of the mandrel 131, and is effected through a link 173 extending from the lever arm 152 downwardly to a guide arm 174 fulcrumed on the base 122, said guide arm having pivoted to it a block 175 from which depends a long link 176 connecting at its lower end to a cam lever 177 similar to the lever 166. The lever 177 is fulcrumed on the axle 167 and its rear end carries a follower entering the cam groove 179 of a cam disk 180 on the main shaft. See Figs. 7 and 13. The cams 169 and 170 are cooperatively timed so that the instrument is advanced or lowered to the work, the bender has its extra descent and is rotated so that the leadwire E is curled about the mandrel, severed and left in proximity to the button or disk D.

The cam levers 166 and 177 each has a forked or T-shape front end 166a or 177a, as Fig. 1 shows thus to operate the described vertical links 165 and 176 for the mechanism 120 and similar links 165× and 176× for the mechanism 120×.

Referring next to the mechanism 120× for operating side wire bending and severing instrument 130×, the upstanding bracket 123 is formed with an enlargement or nearly horizontal slideway 184 for the instrument, and with a nearly vertical rack slideway 185, the latter having a removable cover 186 and frontwardly thereof a nearly horizontal guide 187. The instrument 130× is shown in detail in Figs. 12 and 18 to 21 and its construction and operation are largely analogous to the end instrument 130 as shown in Fig. 14. It comprises a non-rotatable mandrel 131× which in this case is formed with a reduced extremity 131a× providing a shoulder to engage the leadwire F. The mandrel serves not only to have the wire curled around it but it contains a cutting edge 132× for severing the wire. The outwardly extending shank 133× has attached to its extremity a block 134× and a portion 135× of which is guided in the guide 187, thus preventing rotation while permitting longitudinal shifting of the mandrel, a spring 196 pulling rearward on the block tending to force the mandrel into contact against the lower edge of the lamp base sleeve C.

The side instrument 130× comprises also a rotary part 139× surrounding the mandrel and to which is adjustably attached a collar 143× carrying a bending or curling hook 140× of stiff wire adapted to engage the leadwire and carry it around the mandrel. The bending part also has a cutting edge 141× cooperating with the cutting edge 132× of the mandrel for severing the bent leadwire. The bending part 139× may have a threaded shank 138× locked by nut 142× to a sleeve shank 145×, having elongated gear teeth 146×, and at its front end a stud receiving groove 147×.

For effecting the rotary movements of the mandrel 131× and its sleeve shank, the teeth of the latter are engaged by a toothed rack 208, Fig. 2, confined in the slideway 185. Near the lower end of this rack it is provided with an outstanding stud 209 on which is mounted a block 164× through which the cam 170 and rod 165× cause the reciprocation of the rack. By this arrangement the cam 170, lever 166 and their connections effect simultaneously the actuation of the racks of both instruments and therefore the rotation of the bending parts of both the end and side instruments, working on successive lamps.

The sliding of the bending member 139× and its sleeve shank 145× toward and from the lamp base may be effected by a lever arm 211 rigid with a lever arm 210 and extending upwardly from the fulcrum thereof, its upper end formed with a yoke 212 having studs 213 extending into the groove 147× at the front end of the shank. The lever 210, 211 has a block 175× and is oscillated from the cam 180 and link 176×, and this causes the sleeve shank 145× to move rearwardly and frontwardly, as governed by the timing of the cam, simultaneously with the corresponding movements of the sleeve shank of the end instrument. A spring 214 is shown pulling rearwardly on the lever 211 tending to move the bender rearward toward the lamp base. The spring 196 causes the mandrel member to partake of these movements of the bending member until the mandrel contacts and is stopped by the lamp base side, and thereafter the bending member may move further relatively to the mandrel, coming into bending and severing relation thereto. The cam timing, as with instrument 130, causes the instrument to be advanced, and the side leadwire to be curled, severed and laid in proximity to the slight rim at the lower end of the lamp sleeve C, ready for soldering.

Figs. 15 to 17 and 18 to 21 respectively show the bending and severing actions of the end and side instruments. In each case the bending part 140 or 140× engages the wire E or F and wraps it around the mandrel, ending up with the severing of the wire by the coaction of the shear-pair 132, 141 or 132×, 141×.

In Figs. 15 to 17, the end member 139 advances completely as in Fig. 16 following the stopping of mandrel 131 by the lamp, and the rotation of the member as in Fig. 17 then occurs. For the side wire the operation is preferably different, as shown in Figs. 18 to 21, the advancing movement of member 139× being in two stages; it coming first to the Fig. 19 position and its rotation then starting; after rotating to the Fig. 20 position the axial advance being completed, as in Fig. 21 shown, following which the completion of the rotation effects the severing of the completely bent or curled wire. While the side instrument is making the extra advance to Fig. 21 the end instrument may remain as in Fig. 16 by reason of the play permitted by the slotted pivots at the ends of the link 173, Fig. 9.

Figs. 1 and 3 show a bracket 219 at the left side of bracket 124 and pivoted thereon an adjustable arm or rod 220, one end of which is accessible as seen in Fig. 1, and the other end of which carries a hook 221. The arm may be swung by hand to such position, as shown, wherein it will be held by its mountings, that the arm and hook will gather-in each end leadwire E if too far out of place, when its lamp comes to position, and bring it within the recess of bender 139 to be engaged by part 140 by which it is bent or curled around the mandrel 131. In the case of each leadwire the rotary curling action effects a twisting of the wire and this and the scraping and severing serve to clean the wire surface adequately for soldering.

Beyond the mechanisms 120 and 120×, Fig. 1, is shown a pressure wheel 224 on an arm 225 swingable on a bracket 226 on the table 121; the wheel being spring pressed against each lamp base sleeve as it travels by, to press snugly to the sleeve the bent and severed side leadwire.

To this point of description the reference numbers correspond generally with the prior application, though variations in structure and operation have been disclosed.

A device is now shown for pressing down or tamping into place the curled end leadwire E. A tamper or foot 230 is shown in Fig. 11. This is mounted on a lever 232 on the same bracket 226 with arm 225. A link 233 connects the lever with the stud 234 on a lever 235 fulcrumed at 236 on base 122× and connected by link 237 with the block 164× operated by link 165× from cam 170. By this, while each lamp pauses under the tamping presser 230 it descends and pushes down the severed wire into the recess of the lamp base disk D.

Fig. 9 shows an auxiliary device to dispose the loose side leadwire F to avoid conflict as the lamp travels into position for bending and severing the side wire. This is done at the end wire handling station. An adjustable block 240 is fixed on bracket 124. A small bracket 241 thereon carries a light abutment strip 242 below the probable position of wire F. The active member is a bending piece 243 on a bell crank 244 pivoted on block 240. A link 245 extends from lever 174 to lever 244 to swing the bender down, bending the wire end down as shown in dotted lines. The wire thus stands as in Fig. 12 shown and is free of interference and in optimum position for its curling and severing operations.

Another device is that shown in Figs. 4 to 8 for repositioning each lamp at a suitable station before reaching the leadwire mechanism. Each lamp may be inserted in its chuck by hand, with the side leadwire F approximately in radially outward position. This infeed is not reliable, and it is desirable to have the side wire at precisely the correct point, for correct cooperation with the side wire bending and severing mechanism. Figs. 4 to 8 for this purpose show, first, a means for automatically relaxing the chuck so that the lamp can be turned on its axis, Fig. 4 showing this relaxed position, and second a device cooperating with the extended leadwire F to rotate the lamp until the leadwire is at the exact position desired.

The relaxing means has been partially described, the finger 86 overlying the collar 58 and being pulled down by link 88 against spring 93 to lower chuck socket 56 until the lamp is free for rotation, Fig. 4. Link 88 is seen at its lower end in Fig. 7, where it is connected by bellcrank 249 with link 250 extending to depending arm 251 on cam lever 177. The cam 180 thereby lowers and lets up the chuck socket while each head stands at the station where the action is performed, as just prior to the first heating station shown in the prior application.

The device that centers the wire F and so repositions any misplaced lamp is seen in Figs. 4 and 5 in left and rear views. A fixed frame part 253 has an extending bar 254 with a head 255 in which is adjustably mounted the vertical shank 256 of the centering device. A symmetrical pair of centering fingers or blades 258 is shown. They are normally spread apart as in dotted lines Fig. 5, but swing together as shown, thus gathering in the leadwire and eventually bringing it to the position shown, thus turning the relaxed lamp in its chuck. When positioned the blades swing apart after the chuck again grips the lamp.

The fingers are fast on rockshafts 259 turning in a rear bearing 260 formed on the rear cover plate 261 of a hollow body or box 262 carried at the foot of the shank 256. The approach of the blades is limited as in Fig. 5 shown by a contact lug 264 on one blade and opposite to it an adjustable screw 265 on the other blade.

The automatic operation of the repositioning fingers may be as follows. Each rockshaft carries a gear 266 and these gears mesh, giving the symmetrical swinging described. One gear is meshed by a segment rack 267, its hub turning on a stud 268, and having a rightward arm 269, pulled up by a spring 270 to close the device upon the wire. A link 272 depends from arm 269, and its continuation is seen in Fig. 6, where it is shown connected by a bellcrank 273 and link 274 with an arm 275 upstanding from cam lever 166. By these means cam 170 closes and opens the centering blades while the lamp rests in the relaxed chuck, and so accurately repositions each lamp before operation upon its leadwires.

The disclosed embodiment of the invention is illustrative, and various matters of method, operation, combination, mechanism and structure may be extensively modified within the principles hereof; wherefore it is not intended to limit the invention to the disclosed features except so far as specified in the appended claims.

I claim:

1. In a machine for manufacturing electric lamps of the kind composed of bulb and base portions, with interposed cement to secure them together, and one or more leadwires extending from the base, the combination of a traveling conveyor, and a series of lamp-carrying heads thereon, each head having a lamp-holding chuck arranged to leave the lamp base portion and extending leadwire exposed, and means to bend the leadwire into attaching position and sever its excess length, comprising a mandrel member movable to the lamp, a rotary member adapted to engage the leadwire and bend it about the mandrel close to the lamp, and severing means associated with said members and actuated by their relative movement to sever the excess leadwire after bending.

2. In a machine for manufacturing electric lamps of the kind composed of bulb and base portions, with interposed cement to secure them together, and one or more leadwires extending from the base, the combination of a traveling conveyor, and a series of lamp-carrying heads thereon, each head having a lamp-holding chuck arranged to leave the lamp base and leadwire exposed, and means to bend a leadwire into attaching position and sever its excess length, comprising a mandrel shiftable into contact with the lamp, a rotary member slidable and rotatable on the mandrel, a bending means on the rotary member to engage the leadwire and bend it around the mandrel close to the lamp, and said mandrel and member having shearing edges brought into shearing relation by the sliding of the member on the mandrel, and shearing the leadwire by the rotation of the member.

3. In a machine for finishing electric lamps of the kind composed of bulb and base portions, with interposed cement to secure them together, and one or more leadwires extending from the base, the combination of a traveling series of lamp-carrying heads each having a lamp-holding chuck arranged to leave the lamp base and leadwire exposed, mechanism for advancing the head series to bring each head successively to a given station in each cycle of the machine, an instrument operable at said station in one operation to bend a leadwire into attaching position and sever its excess length, and means for actuating said instrument in each cycle to operate upon a lamp in preparation for attaching the bent leadwire to the lamp base; said instrument comprising a mandrel member about which the wire is bent and a rotary member for bending the wire, and said members having cooperating parts to sever the wire after the bending.

4. A machine as in claim 3 and wherein said cooperating parts comprise shearing edges operating to sever the wire by the rotation of said rotary member after the bending.

5. A machine as in claim 3 and wherein are timed means for advancing the instrument to each lamp and rotating said rotary member to effect the bending and severing operations.

6. Lamp finishing machine with one or more heads each having a chuck for holding the assembled lamp base and bulb with leadwires projecting, and characterized by a bending and severing device having bending and severing members adapted for acting upon each lamp to engage a leadwire and bend it close to the lamp base and sever its excess length all in one operation, and means for operating said device; the bending and severing device comprising a mandrel that advances to the lamp base and an adjacent bending member with means causing relative rotation to bend the wire about the mandrel.

7. Machine as in claim 6 and wherein the mandrel is non-rotary and the bender is a surrounding rotary member with a part engaging and bending the wire.

8. Machine as in claim 6 and wherein the severing operation is effected by relative shearing movement between parts of the mandrel member and bending member.

9. Lamp finishing machine with one or more heads each having a chuck for holding the assembled lamp base and bulb with leadwires projecting, and characterized by a bending and severing device having bending and severing members adapted for acting upon each lamp to engage a leadwire and bend it close to the lamp base and sever its excess length all in one operation, and means for operating said device; the bending and severing device comprising a mandrel that advances to the lamp base and an adjacent bending member with means causing relative rotation to bend the wire about the mandrel; and the mandrel member and the surrounding bender member constituting an instrument slidable longitudinally to the lamp and retractible after operation, with timed connections to cause such advance and retraction and the relative movements of the members.

10. Machine as in claim 9 and wherein the bender member is advanced and retracted by the timed connections, while the mandrel is caused by a spring to follow until stopped by the lamp base, whereupon relative rotation is produced to bend the wire about the mandrel.

11. Machine as in claim 9 and wherein the bender member is advanced and retracted by the timed connections, while the mandrel is caused by a spring to follow until stopped by the lamp base, whereupon relative rotation is produced to bend the wire about the mandrel, the two members being so operated that the same rotary movement first bends the wire and then shears off its excess length.

12. A lamp finishing machine comprising lamp holding means or heads, and a bending and severing device adapted and fitted to be advanced to the lamp base, and with bending and severing members there to engage the projecting leadwire and bend it and sever it close to the lamp base, all in the same position of the lamp and in a single quick operation, and at least one of said members taking part both in the bending and the severing; the bending and severing device being arranged to operate upon the leadwire, and a supplemental device operating to press the severed leadwire snugly to the base.

13. A lamp finishing machine comprising traveling lamp holding means or heads, and a bending and severing device adapted and fitted to be advanced to the lamp base, and with bending and severing members there to engage the projecting end leadwire and bend it and sever it close to the lamp base, all in a single quick operation, together with a hook to engage the end leadwire during travel and dispose it to facilitate its bending and severing.

14. A lamp finishing machine comprising traveling lamp holding means or heads, and a bending and severing device adapted and fitted to be advanced to the lamp base, and with bending and severing members there to engage the projecting leadwire and bend it and sever it close to the lamp base, all in a single quick operation; together with a device to dispose the side leadwire before bending.

15. A lamp finishing machine comprising traveling lamp holding means or heads having chucks, and a bending device adapted and fitted to be advanced to the lamp base, and with bending members there to engage the projecting leadwire and bend it together with means to relax a chuck at a station before side leadwire bending, and a device thereupon to reposition the lamp in the chuck to present the leadwire in a predetermined position.

16. Machine as in claim 15 and wherein the repositioning device comprises fingers or blades movable apart and together, with means moving them together to center the side leadwire and thereby reposition the lamp.

17. A lamp finishing machine comprising traveling lamp holding means or heads having chucks, and a bending and severing device adapted and fitted to be advanced to the lamp base, and with bending and severing members there to engage the projecting leadwire and bend it and sever it close to the lamp base, all in a single quick operation; together with means to relax a chuck at a station before side leadwire bending, and a device thereupon to reposition the lamp in the chuck to present the leadwire in a predetermined position.

18. In a machine for finishing electric lamps of the kind composed of bulb and base portions, with interposed cement to secure them together, and one or more leadwires extending from the base, said machine having a traveling series of lamp-carrying heads each having a lamp-holding chuck arranged to leave the lamp base and leadwire exposed, and mechanism for advancing the head series with step by step motion to bring each head to rest successively at each of a series of stations in each cycle of the machine; and characterized by an instrument comprising mutually cooperating and combined bending and severing members adapted to operate at the same stationary position of each lamp and in quick succession to bend a leadwire into position close against the lamp base suitable for soldering thereto and to sever its excess length, while the lamp stands stationary at such station, and means for actuating said instrument in each cycle to operate upon a lamp in preparation for soldering the bent leadwire to the lamp base.

19. Lamp finishing machine with one or more heads each having a chuck for holding the assembled lamp base and bulb with leadwires projecting, and characterized by a single bending and severing device having cooperating bending and severing members adapted for acting upon each lamp to engage a leadwire and bend it close against the lamp base and sever its excess length, while the lamp remains in one position, leaving the severed wire close against the base, at least one of said members taking part in both the bending and severing, and means for operating said device.

20. A lamp finishing machine comprising lamp holding heads, and a bending and severing device adapted and fitted to be advanced to the lamp base, and having cooperating bending and severing members, at least one of said members taking part in both the bending and severing, adapted when advanced to engage the projecting leadwire and bend it and sever it in the same position of the lamp, leaving the shortened wire close to the lamp base, all in a single quick operation.

CHARLES B. PALUCKI.